United States Patent Office.

OSCAR LOEW, OF NEW YORK, N. Y., ASSIGNOR TO REUBEN D. TURNER AND WELLWOOD MURRAY, OF SAME PLACE.

Letters Patent No. 107,071, dated September 6, 1870.

IMPROVEMENT IN PROCESS OF OBTAINING OZONE OR OZONIZED AIR.

The Schedule referred to in these Letters Patent and making part of the same.

To all whom it may concern:

Be it known that I, OSCAR LOEW, of the city, county, and State of New York, have invented a new Process of Obtaining Ozone or Ozonized Air; and I do hereby declare that the following is a full, clear, and exact description of the same.

The process heretofore known of obtaining ozone have been complicated and costly, or, for other reasons, not practically available to any considerable extent, and some simpler and cheaper process has long been sought.

This invention, the object of which is to supply the above-mentioned want, consists in passing a strong current of common air through a flame and collecting the ozone in a suitable receptacle. During the rapid action of the burning gases of the flame upon the air ozone is formed and carried into the receptacle.

The best form of flame for carrying out my invention is that of a Bunsen burner, or one substantially like it. The air to be ozonized is projected through it transversely from a tube by means of a bellows, a rotary fan-blower, or any suitable blowing apparatus, such air coming from the tube in a cold state, or at atmospheric temperature, and the current must be so strong that the flame cannot communicate much heat to it, otherwise a portion of the ozone would be thereby destroyed immediately upon its production.

The receptacle may be a balloon, or any suitable vessel or chamber, having its mouth arranged on the other side of the flame, directly opposite the air-tube.

What I claim as my invention, and desire to secure by Letters Patent, is—

The process of obtaining ozone or ozonized air, by passing common air through a flame, substantially as herein described.

OSCAR LOEW.

Witnesses:
 FRED. HAYNES,
 ARTHUR KINNIER.